United States Patent [19]

Bay-Schmith

[11] 4,091,943

[45] May 30, 1978

[54] METHOD AND APPARATUS FOR LOADING A VEHICLE WITH BALES OF CROP MATERIAL OR SIMILAR UNITS

[76] Inventor: Niels Bay-Schmith, Svanholm, Skibby, Denmark, 4050

[21] Appl. No.: 617,537

[22] Filed: Sept. 29, 1975

[30] Foreign Application Priority Data

Sept. 27, 1974 Denmark .............................. 5100/74

[51] Int. Cl.² .............................................. B65G 57/00
[52] U.S. Cl. ..................... 214/152; 214/6 B; 214/138 R; 214/147 G
[58] Field of Search ................. 214/77 R, 147 G, 152, 214/6 B, 138 R, 78

[56] References Cited

U.S. PATENT DOCUMENTS

| 3,319,813 | 5/1967 | Beyea | 214/147 G |
|---|---|---|---|
| 3,339,763 | 9/1967 | Caywood et al. | 214/138 R |
| 3,631,989 | 1/1972 | McCormick | 214/147 G |
| 3,800,966 | 4/1974 | Newton | 214/77 R |
| 3,809,256 | 5/1974 | Miskin | 214/6 B |

*Primary Examiner*—L. J. Paperner
*Assistant Examiner*—Ross Weaver
*Attorney, Agent, or Firm*—Dennison, Dennison, Meserole & Pollack

[57] ABSTRACT

Bales of crop scattered on a field are loaded on a vehicle by means of a loading apparatus mounted thereon. The loading apparatus comprises a gripping device for successively gripping the bales on the ground and lifting them to a position on the platform of the vehicle. The movements of the gripping device between said positions are performed automatically and controlled by a programmable controlling device which may be programmed in accordance with the desired pattern of stacking the bales on the vehicle platform. While the gripping device is lifting a bale and placing it on the vehicle platform and returning to the bale engaging position the driver drives the vehicle to the next bale to be loaded. The loading apparatus may also be used for reloading the vehicle if the control device is provided with a suitable program.

8 Claims, 4 Drawing Figures

METHOD AND APPARATUS FOR LOADING A VEHICLE WITH BALES OF CROP MATERIAL OR SIMILAR UNITS

BACKGROUND OF THE INVENTION

1. Field of the Invention

The present invention relates to a method for loading bales of crop material or similar units, such as bales of hay or straw on a vehicle.

2. Description of the Prior Art

It is common to press hay, straw, and similar crop materials into bales by means of balers which normally leave the bales in the field arranged in rows. The bales must then later be loaded onto a vehicle, driven to a place of use or storing, and thereafter unloaded from the vehicle. The loading and unloading may be performed manually. However, it is also known to load the bales by means of a loading apparatus having a baler pick-up arranged on one side of the vehicle at the ground surface, and the bales are moved from the pick-up onto the vehicle by means of a conveyor system. In order to obtain a correct function of said known loading apparatus it is necessary that the baler pick-up hits each bale in a certain manner. That means that the bales must be oriented in exactly the same manner on the field. In practice, it is quite often not the case and therefore by using the known loading apparatus it is often necessary to let an assistant move the bales so that all become correctly orientated. Unloading of the bales is most rationally obtained by tilting the vehicle or truck together with the bales arranged thereon. In this manner a number of loads may be arranged immediately adjacent to each other and thus form a stack. However, it has been found that stacks formed by such loads placed loosely side by side are very unstable and often overturn so that the bales become exposed to the influence of the weather and possibly rot.

SUMMARY OF THE INVENTION

The present invention relates to a method for loading a vehicle such as a truck with bales of crop material or similar units by means of movable gripping means of a loading apparatus mounted on said vehicle, said method comprising automatically moving said gripping means in relation to said vehicle between engaging and loading positions in which said gripping means grip or engage and release a bale or unit, respectively, controlling the movements of the gripping means between said positions by means of programmable automatic control means, and moving said vehicle forwards on said field or surface while said gripping means are being moved automatically between said positions. The automatic control means may for example be programmed so as to cause automatic movement of the gripping means between a gripping or engaging position at ground surface level and bale relasing positions above the loading platform of the vehicle. The gripping or engaging position is preferably located at a fixed position in relation to the vehicle and at one side thereof whereas the bale releasing positions preferably change in horizontal as well as in vertical direction so as to arrange the bales in superposed layers on the vehicle and successively in their respective positions in each layer in accordance with the program selected. Normally, the bales are lying on the field in rows in which the bales are substantially uniformly spaced, and the driver of the vehicle may then concentrate his attention on driving along a path extending substantially parallel to the row of bales to be loaded onto the vehicle. The vehicle is preferably driven from one bale to the next at such a speed that the vehicle reaches that next bale substantially at the same time as when the gripping means or gripping device returns to its bale engaging position under the automatic movement in accordance with the selected program. However, the bale engaging position may alternatively be positioned at the discharge opening of a baler forming part of the vehicle and arranged for example between a tractor and a truck being loaded with the bales. In that case the loading apparatus need not be mounted on the truck, but may alternatively be mounted on the tractor or on the baler which picks up the crop material forming a swath or a windrow on the ground surface.

When the bales to be loaded are lying on the field the vehicle may preferably be provided with an indicator which may for example be a flexible antenna-like rod the free end of which indicates the bale engaging position of the gripping device in relation to the vehicle. By using such distance indicator even an untrained driver can easily use the method according to the invention because he only has to drive at a sufficiently high speed from one bale to the next. When the free end of the distance indicator is positioned at that next bale to be loaded he may stop the vehicle, if necessary, and await that the gripping device reaches the bale engaging position. The gripping device may advantageously be provided with a microswitch or other suitable signal providing means adapted to provide a signal when in its bale engaging position the gripping device correctly engages a bale. The said control means may then be programmed so as to stop the movement of the gripping device till the signal providing means has provided a signal to the control means. Thus, the movement of the gripping device will be stopped when reaching its bale engaging position if the vehicle has not reached the next bale in the row of bales, or if the bale is not correctly placed in relation to the gripping device.

In case the bales in each row of bales are not uniformly orientated it may be advantageous to be able to adjust the programmed movement of the gripping device by means of manually operateable control means immediately before or after the gripping device has reached its bale engaging position. Such manually operateable control means make it possible to adjust the movement of the gripping device in the last moment, and this is of special importance when the gripping device is not provided with the signal providing means mentioned above.

Any suitable known type of programmable control means may be used in connection with the method and loading apparatus of the present invention and may be of a mechanical, electrical, or electronic type, and preferably of a type making it possible to select one of a number of possible movement programs. For example, the automatic control means may be programmed in such a manner that the bales are loaded onto the vehicle in superposed layers which are mutually bonded. The substantially improved bond between the bales in each layer and between adjacent layers substantially reduces the risk that a stack formed by tilting a number of truck loads in the manner previously described overturns.

The method according to the invention also makes it possible to obtain other types of automatic unloading of the bales. Thus, the gripping device may successively unload the bales from the vehicle if the automatic control means is programmed so as to unload the bales in the inverse order in relation to the loading operation. The unloading position or bale relasing position may for example be fixed under the unloading operations. Thus, the automatic control means may for example be programmed in such a manner that all of the bales are unloaded and released at the same position on a conveyor which may then convey the bales to a storing site. However, it is also possible to program the automatic control means in such a manner that the gripping device will unload the bales and arrange them in superposed and preferably mutually bonded layers.

The invention also relates to a vehicle for carrying bales of crop or similar units and having a loading apparatus for said units mounted thereon, said loading apparatus comprising bale gripping means adapted to engage and subsequently release a bale or unit, means for moving said gripping means between different positions in relation to said vehicle, programmable control means for controlling the movements of said moving means so as to move said gripping means between said positions in accordance with a predetermined pattern. The said vehicle may be selfpropelled or towed, for example by a tractor. The gripping means or gripping device may for example be movable between a bale engaging position at ground level and releasing or loading positions on or above said vehicle, or between an engaging position at the discharge opening of a baler which may form a train together with the vehicle and the tractor, and positions on or above a loading platform of the vehicle.

BRIEF DESCRIPTION OF THE DRAWINGS

The invention will now be described more in detail with reference to the drawings, wherein.

DESCRIPTION OF PREFERRED EMBODIMENT

Figure 1:
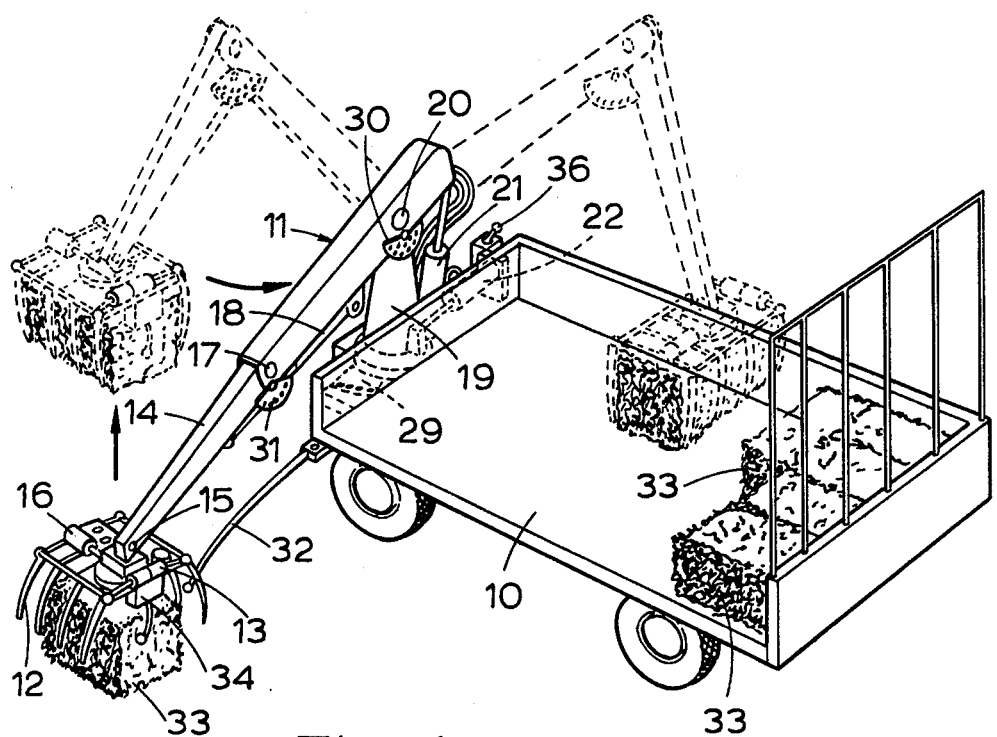
FIG. 1 is a perspective view of an embodiment of the vehicle according to the invention loading bales of crop material onto a loading platform of the vehicle.
Figures 2, 3:
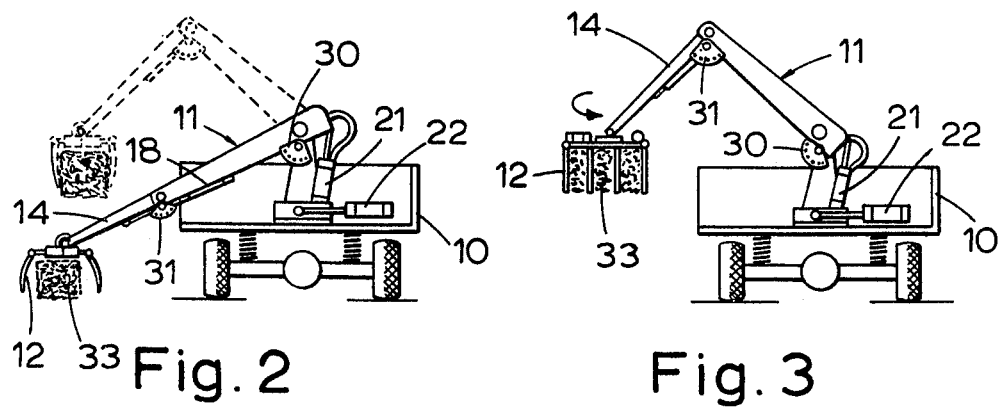
FIGS. 2 and 3 are an end views of the vehicle in smaller scale and with a loading apparatus shown in different positions.

FIGS. 1 - 3 show a vehicle or a truck 10 which may for example be towed by a tractor, not shown. An automatic loading apparatus 11 is mounted on the frame of the truck 10 and comprises a gripping device 12 having jaws which may be moved by means of a fluid cylinder 13, vide FIG. 1. The gripping device is rotatably mounted at the free end of an articulated loading arm 14, the gripping device 12 being rotatable as well about a substantially horizontal axis defined by a pivot pin 15 as about a substantially vertical axis about which the gripping device may be rotated by means of a fluid cylinder 16. The loading arm 14 comprises two sections mutually connected by a pivot pin 17 about which the sections of the loading arm may be moved in relation to each other by means of a fluid cylinder 18. The loading arm 14 is swingably mounted on a substantially vertical column 19 by means of the pivot pin 20, and the loading arm 14 may be moved about that pivot pin by means of a fluid cylinder 21. The column 19 is mounted so that it may be rotated about a substantially vertical axis by means of a fluid cylinder 22.

Figure 4:
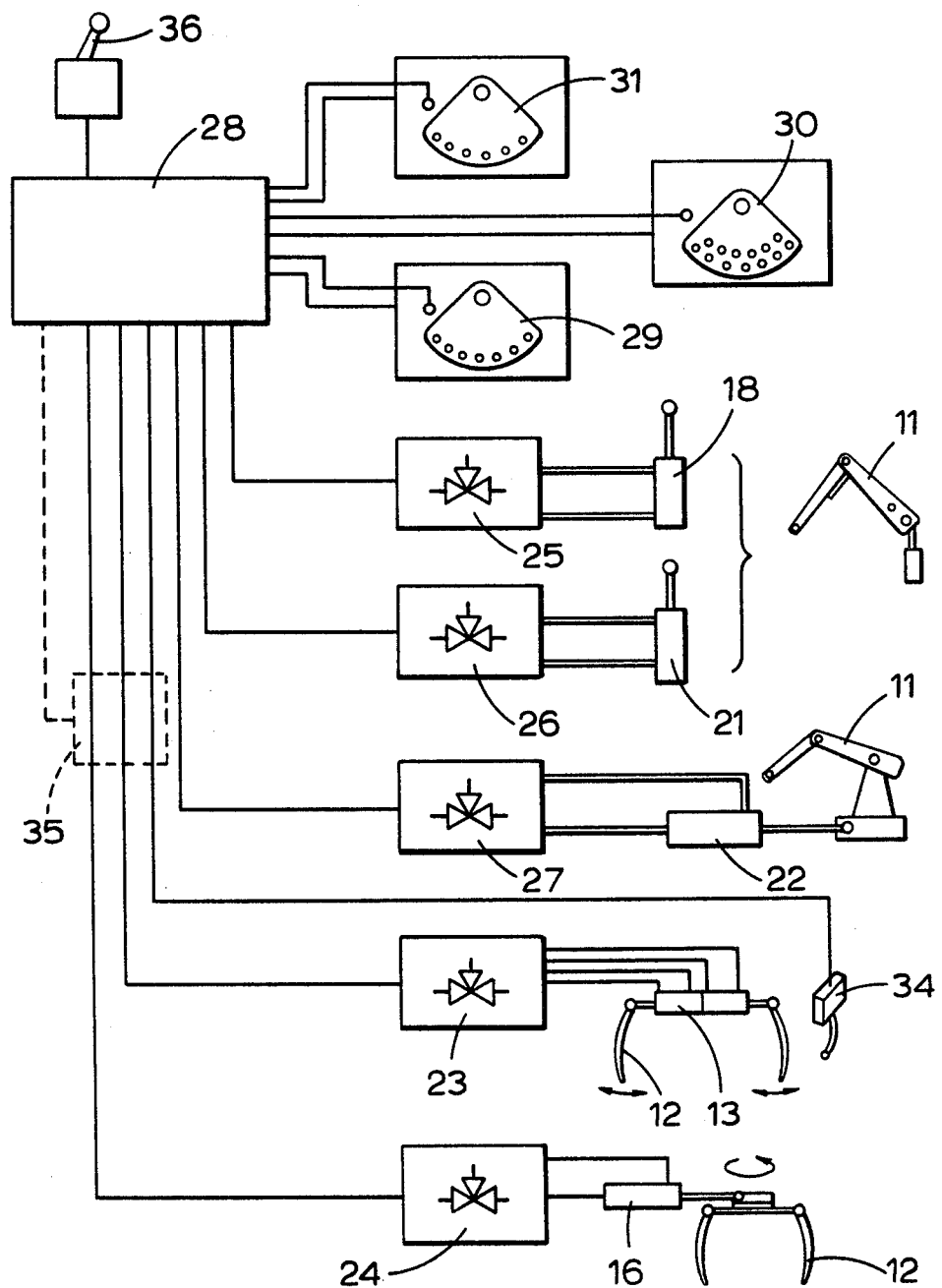
FIG. 4 is a block diagram illustrating diagrammatically the automatic control device controlling the movements of the loading apparatus.

The fluid cylinders 13, 16, 18, 21, and 22 which may be hydraulic or pneumatic, are double-acting and fluid supply to the chambers in these cylinders may be controlled by suitable valves such as solenoid valves shown in FIG. 4 and referred to by 23, 24, 25, 26, and 27, respectively. Pressure fluid is supplied to said valves and cylinders from a pressure fluid source, not shown, for example a compressor or a pump. The function of the solenoid valves 23 - 27 and consequently the supply of pressure fluid to the power cylinders 13, 16, 18, 21, and 22 is controlled by means of a programmable control unit 28 which is connected to and may receive control signals or pulses from position indicators arranged on the loading apparatus 11. These position indicators may for example have the form of contact discs 29, 30, and 31 arranged at the pivot connections at the lower end of the column 19, at the pivot pin 20 between the column 19 and the loading arm 14, and at the pivot pin 17 between the sections of the arm 14.

The control unit 28 which may be of any suitable known type is provided with a suitable program for responding to the dimensions of the loading platform of the vehicle and of the bales and to the desired loading procedure. When the loading apparatus is started the gripping device 12 will automatically be moved to and fro between a gripping or bale engaging position at the ground surface as shown by solid lines in FIG. 1, and a loading position or bale releasing position on the platform of the vehicle. The gripping or engaging position at the ground surface is preferably a fixed position in relation to the vehicle 10 which may advantageously be provided with a distance indicator 32. In FIG. 1 the distance indicator is an antenna-shaped rod having a free end indicating the fixed gripping position of the gripping device 12. On the contrary, the releasing position at the platform of the vehicle normally changes corresponding to the loading pattern desired for each single layer of bales and to the number of layers being formed. The gripping position and the various succeeding loading positions or bale releasing positions desired may be unambiguously defined by the angular position of the column 19, the angular position of the loading arm 14 in relation to the column 19, and by the relative angular position of the two loading arm sections at the pivot pin 17. Consequently, the desired bale engaging and bale releasing positions may be unambiguously defined by means of the contact discs 29 - 31.

When the vehicle 10 is to be used it may be towed by a tractor (not shown) along a path substantially parallel with a row of bales 33 of crop material, such a bales of straw or hay, and the distance between the vehicle 10 and the row of bales preferably corresponds to the length of the distance indicator 32. The driver now starts the automatic programmed movement of the gripping device 12, and when it reaches its gripping or bale engaging position the automatic movement of the gripping device will preferably be stopped till an actuating finger for a microswitch 34 is actuated. This only happens if a bale 33 has been suitably placed between the jaws of the gripping device. When the microswitch 34 is actuated it provides a control signal or pulse to the control unit 28 which thereafter controls the solenoid valve 23 in such a manner that the power cylinder 13 closes the jaws of the gripping device 12 around the bale. Thereafter control signals from the control unit 28 to the solenoid valves 25 - 27 actuate these valves so as to cause the power cylinders 18, 21, and 22 to move the loading arm 14 and the gripping device mounted thereon to a loading or releasing position on the vehicle platform as indicated by broken lines in FIG. 1. When the control unit receives a signal from any of the contact discs 29 – 31 indicating that a position corresponding to the loading or releasing position of the selected program has been reached the control unit stops fluid supply to the respective fluid cylinder, and when the control unit has received such a signal from all of the contact discs associated with the fluid cylinders 18, 21, and 22 the cylinder 13 is actuated so as to cause the gripping device to release the bale 33. The control unit 28 now controls the valves 25 – 27 in such a manner that the cylinders 18, 21, and 22 will return the gripping device 12 to its gripping or bale engaging position at the ground surface. In the meantime the driver of the towing tractor has driven the vehicle 10 to the next bale so that it is positioned immediately opposite to the free end of the distance indicator 32, i.e. in the bale engaging position. Consequently, the microswitch 34 will be actuated by the bale 33 when the gripping device 12 reaches its gripping position, and the loading apparatus will therefore immediately continue its programmed movement so that the gripping device and the said next bale are moved to a loading position located on the vehicle platform so that the new bale is placed closely adjacent to the previously loaded bale or bales. The loading operation may be repeated in the manner described till the vehicle platform has been loaded with the predetermined number of bale layers in each of which the bales are arranged in the pattern desired.

It may be desirable to arrange the bales in such a manner that the superposed layers are mutually bonded. As indicated in FIG. 1, this may for example be obtained by rotating the bales in every second transversely extending row of bales in each layer by 90° in relation to the preceding transverse row. The said rotation of the bales by 90° may be obtained thereby that the control unit 28 causes the valve 24 to actuate the cylinder 16. As illustrated in FIGS. 2 and 3 the rotation of the gripping device 12 may for example take place immediately after lifting the gripping device with a bale from the engaging position at the ground surface towards the loading position on the vehicle platform. The actuation of the cylinders 13 and 16 when the control unit 28 has received a pulse or signal from the microswitch 34 may take place in accordance with a separate program which is indicated by showing a block 35 with broken lines in FIG. 4.

The apparatus may be provided with manually operateable control means 36 by means of which the driver or operator of the vehicle may adjust the automatic programmed movement of the gripping device.

When the vehicle or truck 10 has been loaded with bales in the manner described above and towed to the desired unloading site the unloading may take place in a known manner by tilting the vehicle or truck as previously described. However, in certain cases it may be advantageous to unload the vehicle by using the loading apparatus 11. If it is desired to place all the bales 33 at one and the same position, for example on a conveyor conveying the bales to a storing site, for example onto a hayloft, the control unit 28 may be programmed so as to impart movements to the gripping device 12 substantially inverse to the movements provided during the loading operation. The gripping device will then remove the bales 33 one by one — the bale loaded last will be removed first and the bale loaded first will be removed last — and place them at the desired position on the conveyor. It is also possible to program the control unit 28 in such a manner that the bales 33 are unloaded one by one and arranged side by side and arranged in a desired number of superposed layers. In that case the gripping or bale engaging positions as well as the releasing positions vary in accordance with the predetermined program.

It should be understood that several changes and modifications of the embodiment described above with reference to the drawings may be made without departing from the scope of the present invention. Thus, for example the gripping device may have any suitable form provided that it is able to hold a bale 33 and subsequently release it when desired. Furthermore, the loading arm 14 may be replaced by any mechanism which is able to move the gripping device 12 between the desired gripping and releasing positions. The moving means of the loading apparatus need not necessarily have the form of fluid cylinders as described in connection with the embodiment shown on the drawings, but may for example comprise electric motors or other controlable driving means. It should also be noted that the contact discs 29, 30, and 31 functioning as position indicators may be replaced by other types of position indicating signal providing means. As an example said signal providing means may be actuated by the position of the pistons in the fluid cylinders serving a moving or driving means.

In the embodiment described above the loading apparatus 11 is mounted on the truck 10. It should be understood, however, that the loading apparatus may alternatively be mounted on the tractor towing the truck. The vehicle may also comprise a baler which can pick up crop material lying on the ground surface in swath or windrows and press it into bales. In that case the control unit 28 of the loading apparatus may be programmed so as to locate the gripping or engaging position at the discharge opening of the baler. The loading apparatus 11 may then grip the bales as they are discharged from the baler and load them onto the loading platform of a truck which is preferably trailing the baler.

I claim:

1. A method for selectively loading and unloading a vehicle with successive bales of crop material or similar units by means of movable gripping means of a loading apparatus mounted on said vehicle, said method comprising
    (a) automatically moving said gripping means during the loading mode in relation to said vehicle and said crop unit between unit engaging and unit discharging positions, gripping said units successively, transporting said units to a predetermined discharge position on said vehicle, and releasing said unit at said discharge position thereon,
    (b) automatically moving said gripping means during the unloading mode in relation to said vehicle and said crop unit between unit engaging and unit discharging positions, gripping said units successively and transferring said units to a predetermined discharge position off said vehicle and releasing said unit at said discharge position,
    (c) controlling the movement of the gripping means between said positions by means of programmable automatic control means, and
    (d) selectively positioning said vehicle while said gripping means are being moved automatically between said positions.

2. A method according to claim 1, further comprising use of an indicator mounted on said vehicle for indicating the location of said engaging position relative to said vehicle.

3. A method according to claim 1, wherein the location of said engaging position is manually adjusted by manually operateable control means immediately before said gripping means reach their engaging position.

4. A method according to claim 3, wherein said control means are programmed and operated so as to cause said gripping means to arrange the bales or units on the vehicle in superposed, mutually bonded layers.

5. A method according to claim 1, wherein subsequent to completion of the loading operations said control means are programmed and operated so as to cause said gripping means to successively unload the bales or units loaded onto said vehicle, in an order inverse to the order of loading.

6. A method according to claim 5, wherein said control means are programmed and operated so as to arrange the unloaded bales or units in superposed layers.

7. A method according to claim 6, wherein said bales or units are arranged in a bonded relationship in each of said superposed layers.

8. A method according to claim 5, wherein the bales or units being unloaded are successively placed on a conveyor by said gripping means.

* * * * *